United States Patent [19]

Delvaux et al.

[11] Patent Number: 5,118,544
[45] Date of Patent: * Jun. 2, 1992

[54] HEAT RESISTANT COMPOSITION PROCESSABLE BY VACUUM FORMING

[75] Inventors: Pierre Delvaux, Bromptonville; Normand Lesmerises, Rock Forest, both of Canada

[73] Assignee: Ceram-Sna Inc., Sherbrooke, Canada

[*] Notice: The portion of the term of this patent subsequent to Jan. 15, 2008 has been disclaimed.

[21] Appl. No.: 410,482

[22] Filed: Sep. 21, 1989

[51] Int. Cl.⁵ .................... B32B 9/04; C04B 35/52
[52] U.S. Cl. .................... 428/345; 428/325; 428/364; 428/443; 428/454; 106/699; 501/95; 501/155
[58] Field of Search ............ 428/36.1, 34.5, 312.4, 428/312.6, 325, 364, 443, 454; 106/90, 699, 703; 524/5; 501/95, 155

[56] References Cited

U.S. PATENT DOCUMENTS

| | | | |
|---|---|---|---|
| 2,360,645 | 10/1944 | Bruce et al. | 260/38 |
| 2,586,150 | 2/1952 | Cofek | 260/38 |
| 2,973,336 | 2/1961 | Delaplace et al. | 260/38 |
| 3,224,927 | 12/1965 | Brown et al. | 162/155 |
| 3,297,599 | 1/1967 | Eschen | 260/3 |
| 3,326,843 | 6/1967 | Barnett et al. | 260/38 |
| 3,353,975 | 11/1967 | Shannon et al. | 106/65 |
| 3,367,871 | 2/1968 | Mueller et al. | 252/62 |
| 3,448,071 | 6/1969 | Keller | 260/38 |
| 3,492,262 | 1/1970 | Griffith | 260/38 |
| 3,565,650 | 2/1971 | Cordon | 106/97 |
| 3,616,173 | 10/1971 | Green et al. | 161/162 |
| 3,661,603 | 5/1972 | Nicol | 106/90 |
| 3,682,667 | 8/1972 | Roberts et al. | 106/67 |
| 3,718,491 | 2/1973 | Yates | 106/84 |
| 3,809,566 | 5/1974 | Revord | 106/110 |
| 3,842,031 | 10/1974 | Lumb et al. | 260/38 |
| 3,933,515 | 1/1976 | Yang | 106/99 |
| 3,954,556 | 5/1976 | Jackson et al. | 162/145 |
| 3,974,024 | 8/1976 | Yano et al. | 162/101 |
| 4,101,335 | 7/1978 | Barrable | 106/99 |
| 4,107,376 | 8/1978 | Ishikawa | 428/306 |
| 4,111,891 | 9/1978 | Reynolds, Jr. | 260/38 |
| 4,119,591 | 10/1978 | Aldrich | 260/17.2 |
| 4,128,524 | 12/1978 | Barnett et al. | 260/39 R |
| 4,175,070 | 11/1979 | Klein et al. | 260/38 |
| 4,255,197 | 3/1981 | Peralta et al. | 106/41 |
| 4,274,881 | 6/1981 | Langton et al. | 106/98 |
| 4,277,596 | 7/1981 | Lalancette | 528/106 |
| 4,320,022 | 3/1982 | Aitcin | 252/62.59 |
| 4,363,738 | 12/1982 | Kummermehr | 252/62 |
| 4,414,031 | 11/1983 | Studinka et al. | 106/90 |
| 4,430,157 | 2/1984 | Lalancette | 162/145 |
| 4,461,643 | 7/1984 | Kaufman | 106/36 |
| 4,519,811 | 5/1985 | Lalancette et al. | 51/309 |
| 4,604,140 | 8/1986 | Lalancette et al. | 106/38.9 |
| 4,710,309 | 12/1987 | Miller | 252/62 |
| 4,722,866 | 2/1988 | Wilson et al. | 428/411.1 |
| 4,985,164 | 1/1991 | Delvaux et al. | 252/62 |

FOREIGN PATENT DOCUMENTS 1083809 9/1967 United Kingdom .

OTHER PUBLICATIONS

Ludox Colloidal Silica, p. 312.
Iler. R., "Colloidal Silica-concentrated Sols", *The Chemistry of Silica* (eds) John Wiley & Sons, pp. 312–313.

*Primary Examiner*—James J. Seidleck
*Assistant Examiner*—Charles R. Nold
*Attorney, Agent, or Firm*—Foley & Lardner

[57] ABSTRACT

Disclosed is a heat-resistant composition particularly useful to produce heat-resistant boards, tubes, linings or similar articles, capable of resisting to a high temperature for a substantial period of time. The composition comprises from 30 to 70% by weight of a fibrous-like, synthetic forsterite obtained by calcination of chrysotile asbestos fibers at a temperature of from 650° C. to 1450° C., the synthetic forsterite having an $MgO: SiO_2$ ratio lower than 1.1, a raw loose density of from 3 to 40 pcf, a thermal conductivity "k" factor of from 0.25 to 0.40 BTU. in/hr. °F. ft² and a fusion point of from 1600° C. to 1700° C. The composition also comprises colloidal silica as a binder. If desired, the composition may further comprise reinforcing fibers in such an amount as to give sufficient strength to the composition to make it operative depending on the intended use of the article produced therefrom. This composition can be used in particular to produce fire proofing construction boards, heat-resistant seals or rollers, sleeves, casting molds or furnace insulating components.

11 Claims, No Drawings

HEAT RESISTANT COMPOSITION PROCESSABLE BY VACUUM FORMING

BACKGROUND OF THE INVENTION a) Field of the invention

The present invention relates to a new heatresistant composition particularly useful to produce heatresistant boards, sleeves or linings capable of resisting to high temperatures for substantial periods of time. The invention also relates to the boards, sleeves, linings and similar articles obtained from such a composition by vacuum forming.

b) Brief description of the invention

U.S. patent application Ser. No. 246,198 filed on Nov. 8, 1988 in the name of the same Applicant, discloses and claims a fibrous-like synthetic forsterite product which is particularly useful as an insulating material. This product which is presently offered for sale under the trademark FRITMAG and will be called as such hereinafter, is obtained by subjecting chrysotile asbestos fibers of any commercial grade, having an MgO: SiO2 ratio lower than 1:1, to calcination at a temperature of from 650° to 1450° C.

FRITMAG has a raw loose density of from 3 to 40 pounds per cubic foot, a thermal conductivity K factor of from 0.25 to 0.40 BTU. in/hr. °F.ft$^2$ and a fusion point of about 1600° to 1700° C. It possesses a somewhat fibrous structure ressembling that of the chrysotile asbestos fibers from which it derives, although this fibrous structure has shown to disappear upon rough manipulation, when subjected to pressure, or when mixed with other material. Then, the fibrous structure is lost but the product has and always retains a high insulating value which is quite superior to granular forsterite, or similar to KAOWOOL (trademark) or rockwool.

In the above-mentioned U.S. patent application, it is mentioned that FRITMAG may be used as a substitute for asbestos, whenever a fibrous material to be used in bulk and having high insulating qualities is needed. Indeed, FRITMAG is fibrous and has a loose density range substantially identical to asbestos. It also has high insulating properties and is devoided of all the undesirable health problems allegedly attributed to asbestos.

In the above-mentioned U.S. patent application, it is also suggested to mix FRITMAG with an inert filler and a binder in order to form an insulating composition adapted to be shooted onto any surface to be insulated or to be moulded in the form of slabs for roof insulation. However, no specific example of such a composition is given, except for a short reference made in the specification to a possible mixing with other materials, such as Portland cement. Similarly, no method of manufacturing slabs from such a composition is disclosed, although it is obvious that some of the methods presently used on an industrial scale to manufacture slabs may not be applicable if FRITMAG is part of the combination, because of the change of structure that has been noticed in this product when it is subjected to pressure or mixed with other materials.

SUMMARY OF THE INVENTION

The present invention derives from further studies that have been conducted on FRITMAG since it was first synthetized.

In accordance with the present invention, it has been found that heat-resistant boards, sleeves, linings and, more generally, any kind of heat-resistant articles capable of resisting to very high temperatures over substantial periods of time can be produced from a new heatresistant composition comprising from 30 to 70% by weight of FRITMAG, the balance consisting mainly of colloidal silica as a binder.

The heat-resistant composition according to the invention may also comprise reinforcing fibers preferably selected from the group consisting of cellulose, glasswool, refractory fibers such as ceramic fibers, rockwool and their mixtures, in such an amount as to give sufficient strength, especially tensile strength, to the composition to make the article produced therefrom operative depending on its intended use.

In accordance with the invention, it has also been surprisingly found that the vacuum forming method commonly used for manufacturing heat-resistant boards, sleeves, linings or articles of any specific shape from any heat-resistant composition can also be used with success if use is made of the heat-resistant composition according to the invention as defined hereinabove as starting material. This vacuum forming method which is also used industrially worldwidely, basically consists in subjecting to vacuum an aqueous suspension containing from 1 to 10% by weight of solids. This vacuum forming method is particularly useful to produce boards, sleeves or any hollow shaped articles.

Surprisingly, it has been found that FRITMAG can effectively be used as a substitute for asbestos to produce boards, sleeves or hollow articles through such a vacuum forming method. As a matter of fact, it has been found that FRITMAG behaves as asbestos when subjected to vacuum and gives heat-resistant sleeves, boards or hollow articles that can be subjected to very high temperatures over substantial periods of time and behave as effectively as any similar article made from "standard asbestos composition", such as the one presently sold as MILLBOARD.

As aforesaid, the composition according to the invention may further comprise reinforcing fibers. Advantageously, the amount of reinforcing fibers may be adjusted at will, so as to give sufficient strength, especially tensile strength, to the resulting article to make it operative depending on its intended use. This amount of fibers added to the composition may be very small. Indeed, the addition of such reinforcing fiber is not required by any of the manufacturing methods mentioned hereinabove, but exclusively by the desiderata of the consumer.

Of course, the kind of fibers incorporated into the composition depends on the intended use of the boards, sleeves or heat-resistant articles produced from the composition. As a binder, use is made of colloidal silica like the one sold under the trademark LUDOX. If desired, additional binders such as starch may be used together with colloidal silica.

As aforesaid, the vacuum forming method may be used to produce boards and sleeves. It may also be used to produce other hollow articles of more complicated shape, such as casting molds, furnace insulating components and the like.

The composition according to the invention may further comprise inert fillers and additives known per se in this very specific field. Examples of such additives are siliceous dust, quartz, crushed stones, kaolin, blast furnace slag, etc.

EXAMPLE 1

Plates of 30 cm × 30 cm having a thickness of 0.3 cm were produced by vacuum forming, using the composition given hereinafter as starting material.

| FRITMAG | 10.0 kg |
| --- | --- |
| FIBERFRAX ® | 4.0 kg |
| Starch (EMPRESOL ®) | 0.8 kg |
| LUDOX HS ®-40 | 2.8 kg |

More particularly, the plates were prepared as follows.

Starch previously dissolved into water were added into the process water. FRITMAG and reinforcing fibers of trademark FIBERFARX and LUDOX HS-40 were subsequently added in this order. The concentration of solid in the process water was kept to about 3% and the elements were mixed for a period of time of 5 to 10 minutes prior to being subjected to vacuum forming.

The mixture was then subjected to vacuum forming to produce the requested plates. The resulting plates were compressed to have a volumic weight of 1.25 g/cm³ and were dried at 105° C. for 24 hours.

The tensile and bending strengths of these plates are given in Table I and are compared with the mechanical properties of similar plates obtained from a commercial asbestos-containing MILLBOARD.

After heating at 8 hours at 1000° C., the resulting plates kept about 80% of their mechanical properties. In contrast, the plates obtained from the asbestos-containing MILLBOARD were reduced to dust after heating at 800° C. for 5 hours.

TABLE I

MECHANICAL PROPERTIES AFTER DRYING AT 105° C.

|  | Volume weight gr/cm³ | Bending strength MPa | Tensile strength MPa |
| --- | --- | --- | --- |
| Composition according to the invention | 1.25 | 4.5 | 2.6 |
| Asbestos-containing MILLBOARD (comparative) | 0.90 | 5.6 | 3.0 |

EXAMPLE 2

Cylindrical sleeves having a length of 35 cm, an internal diameter of 10 cm and an external diameter of 14 cm were produced by vacuum forming, starting from the compositions given in Table II hereinafter. Each of the compositions was processed as disclosed in Example 1 hereinabove, prior to being subjected to vacuum forming.

The resulting sleeves was dried for 24 hours at 105° C.

TABLE II

|  |  | COMPOSITION | | |
| --- | --- | --- | --- | --- |
|  |  | A | B | C |
| Starch | (kg) | 0.37 | 0.37 | 0.37 |
| FRITMAG ® | (kg) | 3.68 | 4.65 | 5.56 |
| Rock Wool | (kg) | 2.83 | 1.86 | 0.95 |
| LUDOX HS-40 ® | (kg) | 1.30 | 1.30 | 1.30 |
| Water | (liters) | 163.00 | 163.00 | 163.00 |

The volumic weight of the sleeves produced from compositions A, B and C were equal to 18, 20 and 36 pcf respectively.

EXAMPLE 3

Cylindrical sleeves similar to those disclosed in Example 2 were produced by vacuum forming, using, as starting materials, compositions given in Table III hereinafter. The sleeves were dried for 24 hours at 105° C. The volumic weight of the sleeves produced from compositions D, E and F were equal to 12, 20 and 19 pcf respectively.

TABLE III

|  |  | COMPOSITION | | |
| --- | --- | --- | --- | --- |
|  |  | D | E | F |
| Starch | (kg) | 0.37 | 0.37 | 0.37 |
| FRITMAG ® | (kg) | — | 4.65 | — |
| Rock Wool | (kg) | 6.51 | 1.86 | — |
| Fibers (MANVILLE No. 6) ® | (kg) | — | — | 6.51 |
| LUDOX HS-40 ® | (kg) | 1.30 | 1.30 | 1.30 |
| Water | (liters) | 163.00 | 163.00 | 163.00 |

The sleeves that were so obtained were hermatically closed at their bottom and aluminum was casted in molded form at a temperature about 800° C. inside the same. A temperature sensor was placed into the aluminum to follow the evolution of the temperature. The result of these tests are reported in Table IV.

TABLE IV

VARIATION OF THE ALUMINUM TEMPERATURE INSIDE THE SLEEVES

|  | COMPOSITION | | |
| --- | --- | --- | --- |
|  | D | E | F |
| Time (in minute) | °C. | °C. | °C. |
| 2.5 | 673 | 750 | 750 |
| 5.0 | 657 | 725 | 715 |
| 7.5 | 650 | 700 | 680 |
| 10.0 | 650 | 675 | 660 |
| 12.5 | 650 | 660 | 650 |
| 15.0 | 650 | 650 | 650 |
| 20.0 | 649 | 650 | 650 |
| 25.0 | 648 | 650 | 650 |

As can be noted, the sleeves made from composition E had a behaviour that was equal to or slightly better than the the behaviour of the sleeves made from composition F. Both of these sleeves had undergone very small degradation after complete cooling of the aluminum. The sleeves made from composition E (i.e. from the composition containing FRITMAG) had a behaviour much superior to the sleeves made from composition D. The sleeves made from this composition D underwent substantial degradation after cooling of the aluminum.

What is claimed is:

1. A heat-resistant composition processable by vacuum forming to produce articles capable of resisting high temperatures for substantial periods of time, said composition comprising an aqueous suspension comprising from 1 to 10% by weight of a mixture, said mixture comprising:

from 30 to 70% by weight of a fibrous-like, synthetic forsterite obtained by calcination of chrysotile asbestos fibers at a temperature of from 650° C. to 1450° C., said synthetic forsterite having an MgO:SiO₂ ratio lower than 1.1, a raw loose density of from 3 to 40 pcf, a thermal conductivity "k" factor of from 0.25 to 0.40 BTU. in/hr. °F. ft$^2$ and a fusion point of from 1600° C. to 1700° C.; and colloidal silica as a binder.

2. The composition of claim 1, further comprising starch as an additional binder in said mixture.

3. The composition of claim 1, further comprising reinforcing fibers present in said mixture.

4. The composition of claim 3, wherein said reinforcing fibers are selected from the group consisting of cellulose, glasswool, refractory fibers, rockwool and their mixtures.

5. The composition of claim 2, further comprising reinforcing fibers present in said mixture.

6. A heat-resistant board obtained by vacuum forming of an aqueous suspension containg from 1 to 10% by weight of the composition of claim 4.

7. A heat-resistant board obtained by vacuum forming of an aqueous suspension containing 1 to 10% by weight of the composition of claim 5.

8. A heat-resistant sleeve obtained by vacuum forming of an aqueous suspension containing from 1 to 10% by weight of the composition of claim 4.

9. A heat-resistant sleeve obtained by vacuum forming of an aqueous suspension containing from 1 to 10% by weight of the composition of claim 5.

10. A heat-resistant lining obtained by vacuum forming of an aqueous suspension of the composition of claim 4.

11. A heat-resistant lining obtained by vacuum forming of an aqueous suspension of the composition of claim 5.

* * * * *